US008995834B2

(12) United States Patent
Krongold et al.

(10) Patent No.: US 8,995,834 B2
(45) Date of Patent: Mar. 31, 2015

(54) BLIND EQUALIZATION FOR POLARIZATION-SWITCHED QPSK OPTICAL COMMUNICATIONS

(75) Inventors: Brian Krongold, Parkville (AU); Timo Pfau, Westfield, NJ (US); Noriaki Kaneda, Westfield, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 187 days.

(21) Appl. No.: 13/335,326

(22) Filed: Dec. 22, 2011

(65) Prior Publication Data

US 2013/0163988 A1 Jun. 27, 2013

(51) Int. Cl.
*H04J 14/06* (2006.01)
*H04B 10/06* (2006.01)
*H04B 10/69* (2013.01)

(52) U.S. Cl.
CPC ............ *H04J 14/06* (2013.01); *H04B 10/6971* (2013.01)
USPC ............................................ 398/65; 398/205

(58) Field of Classification Search
USPC ........................................................ 398/202
See application file for complete search history.

(56) References Cited

U.S. PATENT DOCUMENTS

| 2002/0131131 | A1* | 9/2002 | Nagel et al. | 359/173 |
|---|---|---|---|---|
| 2009/0190926 | A1* | 7/2009 | Charlet et al. | 398/74 |
| 2012/0128377 | A1* | 5/2012 | Hatae et al. | 398/208 |
| 2013/0138375 | A1* | 5/2013 | Zhou et al. | 702/66 |

OTHER PUBLICATIONS

Blind adaptive equalization of polarization-switched QPSK modulation,published Apr. 18, 2011, Apr. 25, 2011 / vol. 19, No. 9 / Optics Express 8535,David S. Millar and Seb J. Savory.*
Generation and long-haul transmission of polarization-switched QPSK at 42.9 Gb/s,published Apr. 27, 2011,May 9, 2011 / vol. 19, No. 10 / Optics Express, David S. Millar, Domaniç Lavery, Sergejs Makovejs, Carsten Behrens, Benn C. Thomsen, Polina Bayvel, and Seb J. Savory.*
Adaptive Filters, V. John Mathews Scott C. Douglas, Copyright © 2003 V John Mathews and Scott C Douglas.*
Millar, David S., et al., "Blind Adaptive Equalization of Polarization-Switched QPSK Modulation", Optics Express, vol. 19, No. 9, Apr. 25, 2011, pp. 8533-8538.
Leven, Andreas, et al., "Real-Time Implementation of digital Signal Processing for Coherent Optical Digital Communication Systems", 2010 IEEE, pp. 1227-1234.
Agrell, Erik, et al., "Power-Efficient Modulation Formats in coherent Transmission Systems", 2009 IEEE, pp. 5115-5126.
Millar, David S., "Generation and long-haul transmission of polarization-switched QPSK at 42.9 Gb/s", Optics Express, Vol, 19, No. 10, May 9, 2011, pp. 9296-9302.

* cited by examiner

*Primary Examiner* — Shi K Li
*Assistant Examiner* — Mina Shalaby
(74) *Attorney, Agent, or Firm* — Hitt Gaines, PC

(57) ABSTRACT

An apparatus, e.g. an optical receiver, includes an optical front end and an equalizer. The front end is configured for receiving an optical signal bearing first and second symbols on respective first and second polarization channels. The equalizer is configured to 1) select a first cost function if the first symbol has greater energy than the second symbol, 2) select a second different cost function if the second symbol has a greater energy than the first symbol, and 3) based on the selected cost function, update coefficients of an adaptive filter configured to demultiplex and equalize the first and second polarization channels.

21 Claims, 7 Drawing Sheets

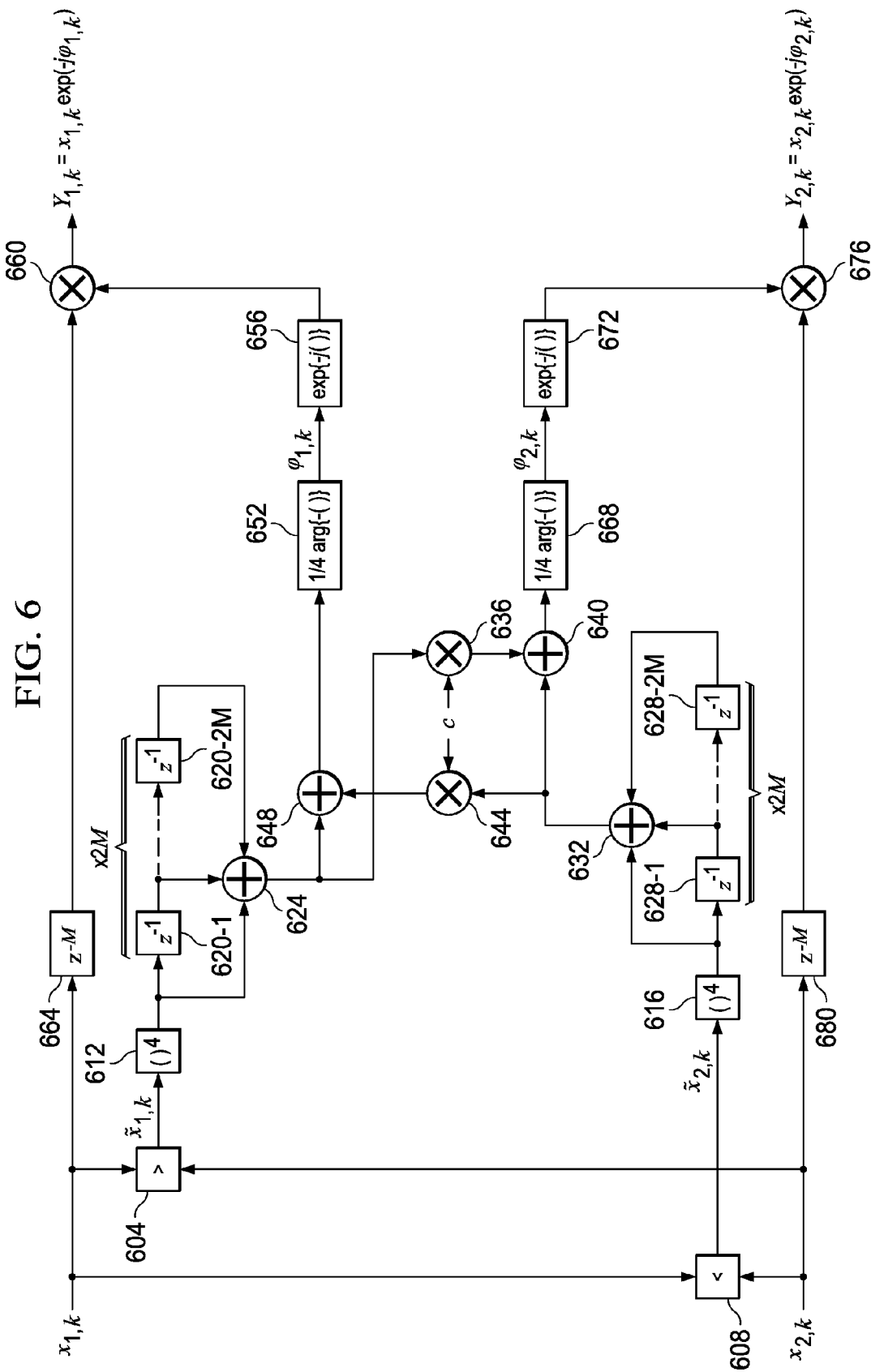

US 8,995,834 B2

BLIND EQUALIZATION FOR POLARIZATION-SWITCHED QPSK OPTICAL COMMUNICATIONS

TECHNICAL FIELD

This application is directed, in general, to optical communications systems and methods.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Blind equalization is a digital signal processing technique of using signal statistics of a received signal to infer (equalize) the transmitted signal from the received signal, while making use of the transmitted signal statistics.

Blind equalization may be viewed as essentially blind de-convolution applied to digital communications. Nonetheless, the emphasis in blind equalization is on online estimation of the equalizer filter (which is the inverse of the channel impulse response) rather than estimation of the channel impulse response itself. This is due in part to the common use of blind equalization in digital communications systems as a way to extract the continuously transmitted signal from the received signal.

One modulation format is polarization-switched (PS) Quadrature Phase-Shift Keying (QPSK). Various approaches to blind equalization in PS-QPSK have been investigated, but suffer from various impairments that render PS-QPSK an unsuitable modulation format for some applications, such as long-haul optical fiber communications.

SUMMARY

One aspect provides an apparatus, e.g. an optical receiver. The apparatus includes an optical front end and an equalizer. The front end is configured to receive an optical signal bearing first and second symbols on respective first and second polarization channels. The equalizer is configured to 1) select a first cost function if the first symbol has greater energy than the second symbol, 2) select a second different cost function if the second symbol has a greater energy than the first symbol, and 3) based on the selected cost function, update coefficients of an adaptive filter configured to demultiplex and equalize the first and second polarization channels.

Another aspect provides an apparatus, e.g. an optical receiver. The apparatus includes an optical front end and a phase compensator. The optical front end is configured to receive an optical signal bearing first and second symbols on respective first and second polarization channels. The phase compensator is configured to compute an estimated phase of the optical signal. The estimate is based on the first symbol if the first symbol has a greater energy than the second symbol, and based on the second symbol if the second symbol has a greater energy than the first symbol.

Another aspect provides a method, e.g. for forming an optical receiver. The method includes configuring an optical front end and an equalizer. The front end is configured to receive an optical signal bearing first and second symbols on respective first and second polarization channels. The equalizer is configured to 1) select a first cost function if the first symbol has greater energy than the second symbol, 2) select a second different cost function if the second symbol has a greater energy than the first symbol, and 3) based on the selected cost function, update coefficients of an adaptive filter configured to demultiplex and equalize the first and second polarization channels.

Yet another aspect provides a method, e.g. for receiving an optical symbol stream by a front end of an optical receiver. A first cost function is selected if a first received symbol on a first polarization channel has greater energy than a second received symbol on a second polarization channel. A second different cost function is selected if the second symbol has a greater energy than the first symbol. Based on the selected cost function, coefficients are updated of an adaptive filter configured to demultiplex and equalize the first and second polarization channels.

BRIEF DESCRIPTION

Reference is now made to the following descriptions taken in conjunction with the accompanying drawings, in which:

FIG. 6 illustrates a computational block diagram of a method of correcting for non-linear phase noise in a received signal, e.g. a PS-QPSK modulated signal;

Figure 7:
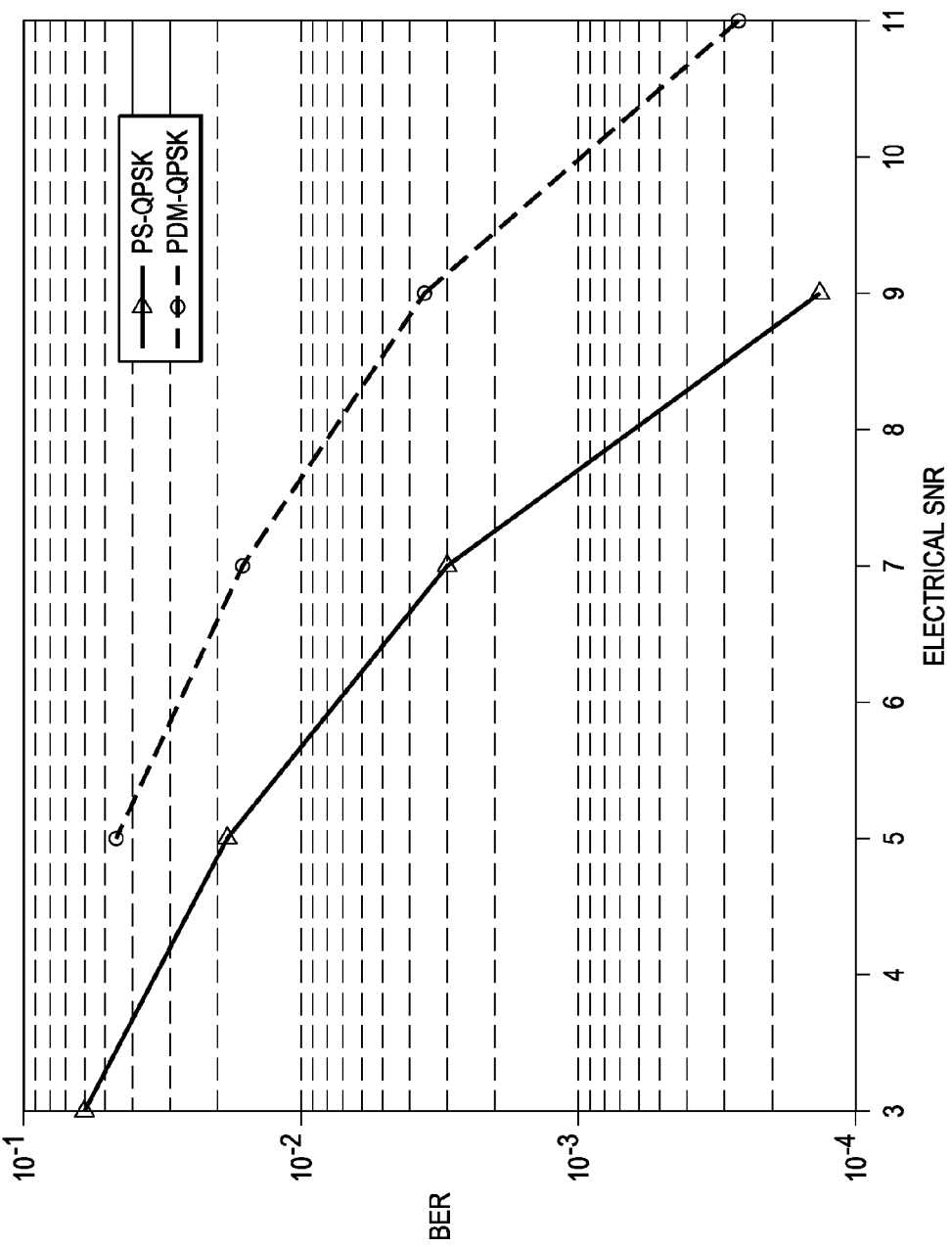
Figure 8:
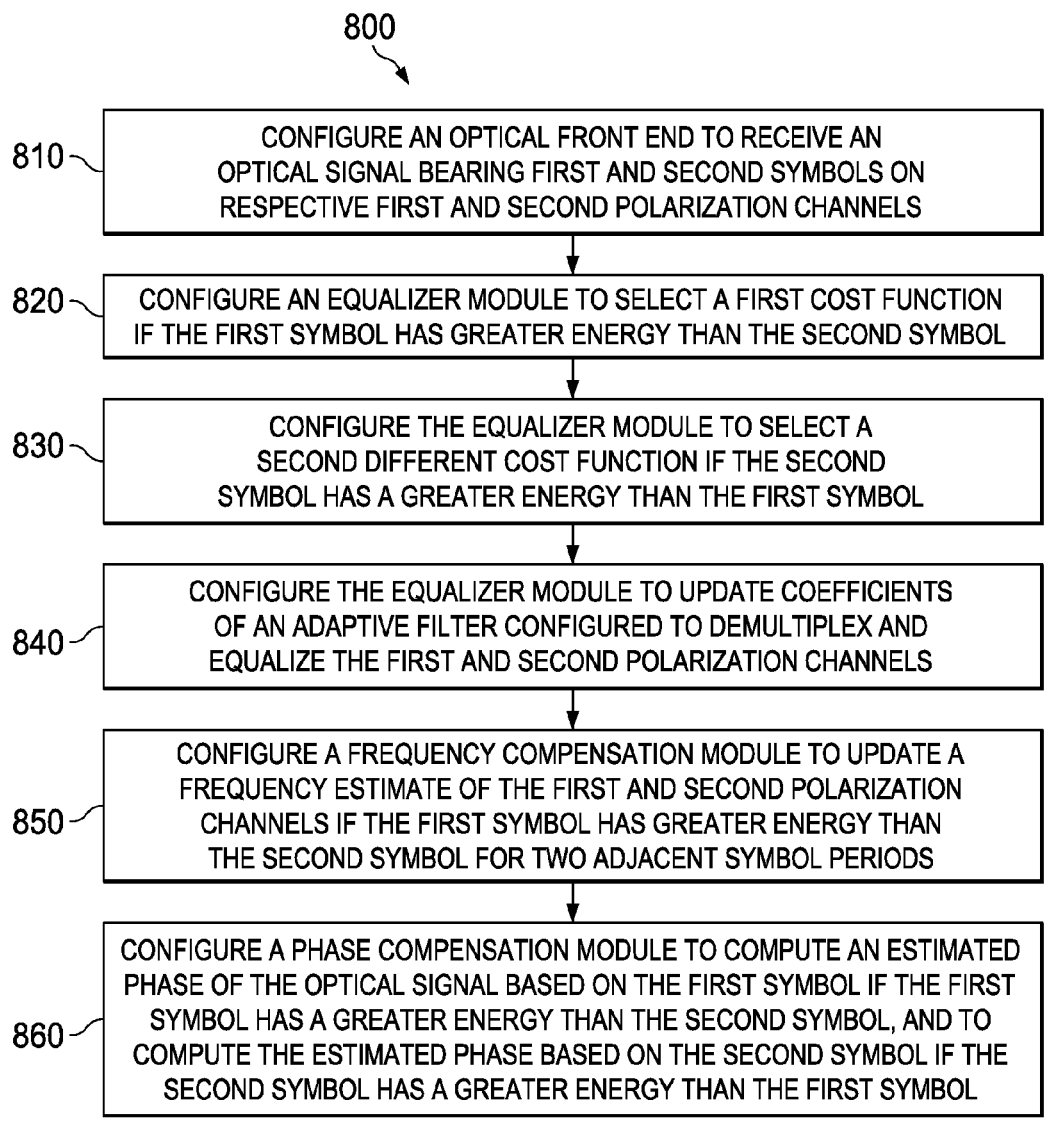

FIG. 7 compares simulated bit-error rate characteristics of a conventional PDM-QPSK modulation scheme and a PS-QPSK modulation scheme including various embodiments described by, e.g. FIGS. 1-6; and FIG. 8 presents a method, e.g. for forming an optical PS-QPSK optical receiver including various embodiments as described by, e.g. FIGS. 1-6.

DETAILED DESCRIPTION

Various embodiments provide systems and methods for blindly equalizing polarization-switched (PS) QPSK signals transmitted via, e.g. optical links. Embodiments described herein overcome some of the deficiencies of conventional approaches to PS-QPSK blind equalization, such as the ability to jointly equalize and perform carrier and phase compensation for proper demodulation. In many cases PS-QPSK may provide increased sensitivity relative to polarization-division multiplexed (PDM) QPSK transmission.

PS-QPSK is a 4-dimensional constellation method, while PDM-QPSK is a 2-D constellation method. Therefore PS-QPSK requires a different equalizer and symbol detection scheme than does PDM-QPSK. For example, PDM-QPSK employs two 2-D constellations that are independent of one another, which allows for comparatively easier equalization and detection.

The PS method may be regarded as more power efficient and as potentially providing longer reach in undersea links and other long-haul optical communications applications than some alternative transmission formants. PS-QPSK typically has about 75% of the spectral efficiency of PDM-QPSK. However, the greater potential power efficiency and transmission reach of PS-QPSK offer sufficient benefits to outweigh the lower spectral efficiency for some applications. PS-QPSK may also be implemented in rate adaptive systems when a lower rate is sufficient.

However, approaches that can blindly equalize PS-QPSK signals are relatively unknown, and suffer from various deficiencies. For example, some methods of blind equalization of PS-QPSK signals required a special decorrelation method of signaling in order for a standard constant modulus algorithm (CMA) to work. But such a process can reduce the performance of PS-QPSK, in particular over long-haul links. Such long paths typically use higher instantaneous transmit power than shorter transmission paths, which can lead to a greater noise contribution from nonlinear effects.

Moreover, typical methods of blind equalization in CMA communication do not work in the case of PS-QPSK. This is due to, e.g., correlated data among the multiple channels (i.e., two polarizations) of PS-QPSK. Because the light has two polarizations, two symbols (one in each polarization) are received every symbol period. With PS-QPSK, one symbol must be a QPSK constellation point and the other a transmitted 0, and therefore, the polarization "channels" are correlated.

It is possible to equalize the channels by using a data-aided approach that uses training data. However, this typically requires extra computational overhead or a decision-feedback approach. The decision-feedback approach suffers from difficulty of implementation due to latency problems with the adaptation. This is because the carrier frequency recovery and phase recovery are performed first before a symbol decision can be fed back.

Various embodiments described herein and otherwise within the scope of the disclosure use one or more algorithms that take into account the relative strength of symbols simultaneously received via two polarization channels in a QPSK-modulated signal. For example, some embodiments employ a data-dependent equalizer cost function, data-dependent intermediate frequency compensation, and/or data-dependent carrier recovery.

It should be noted that the blind approach used in embodiments of the disclosure could be used after a data-aided approach provides initial convergence of the equalizer. One way of interpreting embodiments of the disclosure is that such embodiments may perform decision-feedback of magnitude only, and thus, phase and carrier recovery are not needed.

Two symbols are received in each symbol period, e.g. a QPSK constellation point and a transmitted 0 (sometimes called the "switch symbol"). A probabilistic choice is made as to which symbol is the QPSK bit symbol and which is the switch symbol. The polarization with the greater energy is more likely to be the QPSK symbol and is interpreted as such, while the lower energy polarization is interpreted as the switch symbol. This approach saves energy by not transmitting anything for the switch symbol. This reduces each symbol period to 3 bits (instead of 4 bits with PDM-QPSK), but requires less power than PDM-QPSK for the same bit-error rate transmission of data.

Figure 1:
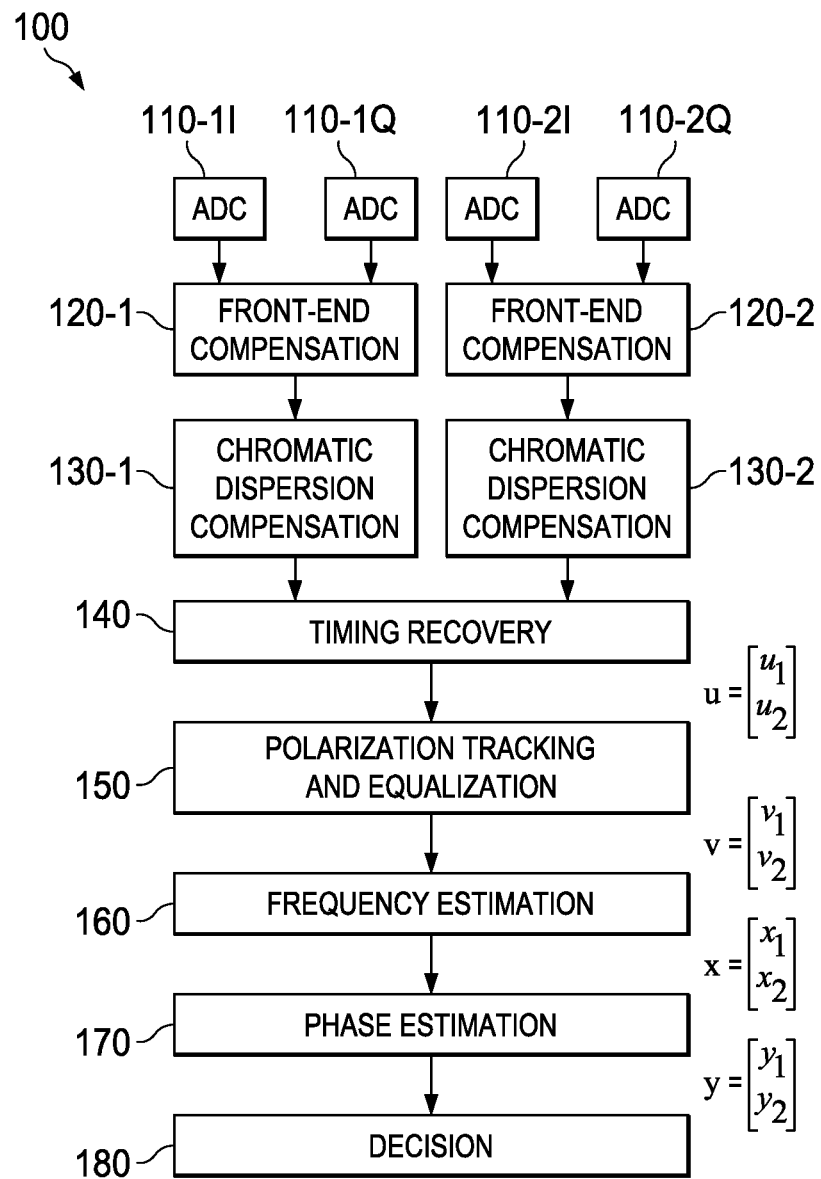
FIG. 1 is a system, e.g. an optical PS-QPSK receiver, according to one illustrative embodiment.

Turning now to FIG. 1, illustrated is an optical receiver 100 according to one nonlimiting embodiment. The receiver 100 in various embodiments receives a PS-QPSK modulated signal. The receiver includes four analog-to-digital converters (ADCs) 110-1I, 110-1Q, 110-2I and 110-2Q, front-end compensators 120-1 and 120-2, chromatic dispersion compensators 130-1 and 130-2, and a timing recovery module 140.

Each of the modules 110-1I, 110-1Q, 110-2I. 110-2Q, 120-1, 120-2, 130-1, 130-2 and 140 may be conventional or unconventional without limitation thereto. Following the timing recovery module 140 are a polarization tracking and equalization module 150, a frequency estimation module 160, a phase estimation module 170, and a decision module 180. These modules are described in detail below.

The ADC pair 110-1I and 110-1Q respectively receive in-phase (I) and quadrature (Q) signals of a first polarization channel of the received signal. The ADC pair 110-2I and 110-2Q respectively receive I and Q signals of a second polarization channel of a received signal. The first and second polarization channels may correspond to, e.g. horizontal (H) and vertical (V) polarizations of a received optical signal.

The front-end compensator 120-1 receives symbol streams from each of the ADCs 110-1I and 110-1Q. The front-end compensator 120-2 receives symbol streams from each of the ADCs 110-2I and 110-2Q. The compensators 120-1 and 120-2 provide initial signal processing functions to correct signal imperfections introduced by the receiver front-end, such as by adjusting the levels of one or both of the received signals.

The chromatic dispersion compensator 130-1 receives the symbol stream from the compensator 120-1, and the chromatic dispersion compensator 130-2 receives the symbol stream from the compensator 120-2. The compensators 130-1 and 130-2 compensate the symbol streams to correct for chromatic dispersion of the received optical signal that may have occurred during transmission.

The timing recovery module 140 receives the symbol streams from the dispersion compensators 130-1 and 130-2 and recovers the symbol timing for the combined symbol stream.

The polarization tracking and equalization module 150 receives the symbol stream from the timing recovery module 140, and inverts the channel and adjusts the polarization of received symbols in the data stream. The frequency estimation module 160 receives the adjusted symbol stream from the equalization module 150, estimates the intermediate frequency (IF) of the received symbol stream and subtracts it from the symbol stream. The phase estimation module 170 receives the symbol stream from the frequency estimation module 160, estimates a phase of each received symbol and subtracts it from the symbol. Finally, the decision module 180 receives the symbol stream from the phase estimation module 170 and selects the value of the symbol.

The receiver 100 implements a 4-D maximum-likelihood (ML) detection scheme, as described below. This ML approach separates the operation of the cost function in the equalization module 150 from the symbol detections in the decision module 180. Since the cost function choice does not incorporate phase, it may in some cases choose the switch and QPSK symbols inaccurately due to a low-probability noise realization. After equalization and phase/carrier recovery, respectively by the modules 160 and 170, a more accurate detection can be achieved by the decision module 180, resulting in a lower Bit Error Rate (BER). It is noted that such an event is not expected to happen often enough to have a significant impact on the equalizer performance. However, the ML detection scheme can reduce the BER by 5% to 30%, depending on SNR, versus using the switch-symbol decision after the equalizer.

The receiver 100 may be implemented with any conventional or novel phase compensator of electronic devices, including without limitation a state machine or microcontroller, combinatorial logic, and a field-programmable gate array (FPGA). Those skilled in the pertinent art are capable of rendering the various embodiments described herein without undue experimentation.

The operation of the polarization tracking and equalization module 150, the frequency estimation module 160, the phase estimation module 170 and the decision module 180 are now considered in detail in turn below.

Polarization Tracking And Equalization Module

The polarization tracking and equalization module 150 provides polarization tracking and Polarization Mode Dispersion (PMD) equalization functions. These functions may be performed using a two-in two-out adaptive filter. An adaptive filter can be partitioned into three parts: a filter bank, an error estimator, and an updater for updating the coefficients of the filter bank.

The filter bank applies a filter of a form v=Wu, where a symbol pair received by the equalization module 150 is $$u = \begin{bmatrix} u_1 \\ u_2 \end{bmatrix},$$

where $u_1$ is the symbol associated with the first polarization (e.g. H) and $u_2$ is the symbol associated with the second polarization (e.g. V). A symbol pair output by the equalization module 150 is $$v = \begin{bmatrix} v_1 \\ v_2 \end{bmatrix},$$

where $v_1$ is the filtered symbol associated with the first polarization and $v_2$ is the filtered symbol associated with the second polarization. A filter coefficient matrix as shown in Eq. 1 represents an equalizing filter W.

$$W = \begin{bmatrix} W_{11} & W_{12} \\ W_{21} & W_{22} \end{bmatrix} \quad (1)$$

The error estimator implements a cost function, e.g. based on a PS-CMA (constant modulus algorithm) algorithm. The cost function is data-dependent, e.g. is based on the received signal power. If energy in the $u_1$ polarization, $E(u_1)$, is greater than that of the $u_2$ polarization, $E(u_2)$, the PS-CMA algorithm adapts assuming that $u_1$ contains QPSK data, and $u_2$ is the switch symbol (0). Conversely, if $E(u_2)$ is greater than $E(u_1)$ the PS-CMA algorithm adapts assuming that $u_2$ contains the QPSK data.

In either case the PS-CMA algorithm seeks a minimum of the cost function based on a targeted magnitude of each signal. The absolute value of the signal may be used as a proxy for the energy, and a cost function J(W) may be defined for each of two cases. In a first case, at a particular time index k, $|u_1|>|u_2|$, and the cost function may be described by Eq. 2:

$$J(W) = (|u_1|^2 - 1)^2 + (|u_2|^2)^2 \quad (2)$$

On the other hand, if $|u_2|>|u_1|$ then the cost function may be described by Eq. 3:

$$J(W) = (|u_1|^2)^2 + (|u_2|^2 - 1)^2 \quad (3)$$

For the case that $|u_1|=|u_2|$ the cost function may be pseudo-randomly selected from between Equations 1 and 2.

The updater updates the coefficients of the W matrix after the filter processes a kth symbol, with the updated filter coefficients applied to the $k+1^{st}$ symbol. This update is expressed as $$W^{i+1} = W^i - \mu \nabla J(W) \quad (4)$$

where $\nabla J(W)$ is the gradient of the cost function (e.g. Eq. 2 or 3) with respect to W, and μ is a weighting coefficient determinable by one skilled in the art for a particular application.

The cost function gradient is determined for each of two cases represented by Equations 1 and 2. Eq. 5 shows the first case, in which $u_1$ is taken to be QPSK-modulated, and $u_2$ is taken to be the switch symbol (0) based on the relative energies of $u_1$ and $u_2$, e.g. $|u_1|>|u_2|$. Eq. 6 shows the second case, in which $u_2$ is taken to be QPSK-modulated, and $u_1$ is taken to be 0, e.g. $|u_2|>|u_1|$.

$$\nabla J(W) = \begin{bmatrix} \frac{\partial J(W)}{\partial W_{11}} & \frac{\partial J(W)}{\partial W_{12}} \\ \frac{\partial J(W)}{\partial W_{21}} & \frac{\partial J(W)}{\partial W_{22}} \end{bmatrix} \quad (5)$$

$$= \begin{bmatrix} 2 \cdot (|v_1|^2 - 1) \cdot v_1 \cdot u_1^* & 2 \cdot (|v_1|^2 - 1) \cdot v_1 \cdot u_2^* \\ 2 \cdot |v_2|^2 \cdot v_2 \cdot u_1^* & 2 \cdot |v_2|^2 \cdot v_2 \cdot u_2^* \end{bmatrix}$$

$$\nabla J(W) = \begin{bmatrix} \frac{\partial J(W)}{\partial W_{11}} & \frac{\partial J(W)}{\partial W_{12}} \\ \frac{\partial J(W)}{\partial W_{21}} & \frac{\partial J(W)}{\partial W_{22}} \end{bmatrix} \quad (6)$$

$$= \begin{bmatrix} 2 \cdot |v_1|^2 \cdot v_1 \cdot u_1^* & 2 \cdot |v_1|^2 \cdot v_1 \cdot u_2^* \\ 2 \cdot (|v_2|^2 - 1) \cdot v_2 \cdot u_1^* & 2 \cdot (|v_2|^2 - 1) \cdot v_2 \cdot u_2^* \end{bmatrix}$$

where u* signifies the complex conjugate of u.

The PS-CMA adaptation may be extended to the case of polarization mode dispersion (PMD). In this case the filter applies a set of L matrixes that represent four digital filters. The $l^{th}$ coefficient matrix is denoted W(l). Then for the case that $|u_1|>|u_2|$, $$\nabla J(W(l)) = \begin{bmatrix} 2 \cdot (|v_1(i)|^2 - 1) \cdot & 2 \cdot (|v_1(i)|^2 - 1) \cdot \\ v_1(i) \cdot u_1^*(i-l) & v_1(i) \cdot u_2^*(i-l) \\ 2 \cdot |v_2(i)|^2 \cdot v_2(i) \cdot u_1^*(i-l) & 2 \cdot |v_2(i)|^2 \cdot v_2(i) \cdot u_2^*(i-l) \end{bmatrix}, \quad (7)$$

and for the case that $|u_2|>|u_1|$, $$\nabla J(W(l)) = \begin{bmatrix} 2 \cdot |v_1(i)|^2 \cdot v_1(i) \cdot u_1^*(i-l) & 2 \cdot |v_1(i)|^2 \cdot v_1(i) \cdot u_2^*(i-l) \\ 2 \cdot (|v_2(i)|^2 - 1) \cdot & 2 \cdot (|v_2(i)|^2 - 1) \cdot \\ v_2(i) \cdot u_1^*(i-l) & v_2(i) \cdot u_2^*(i-l) \end{bmatrix}. \quad (8)$$

In the rare case that $|v_1(k)|=|v_2(k)|$, Eqs. 7 and 8 may be selected pseudo-randomly.

Figure 2:
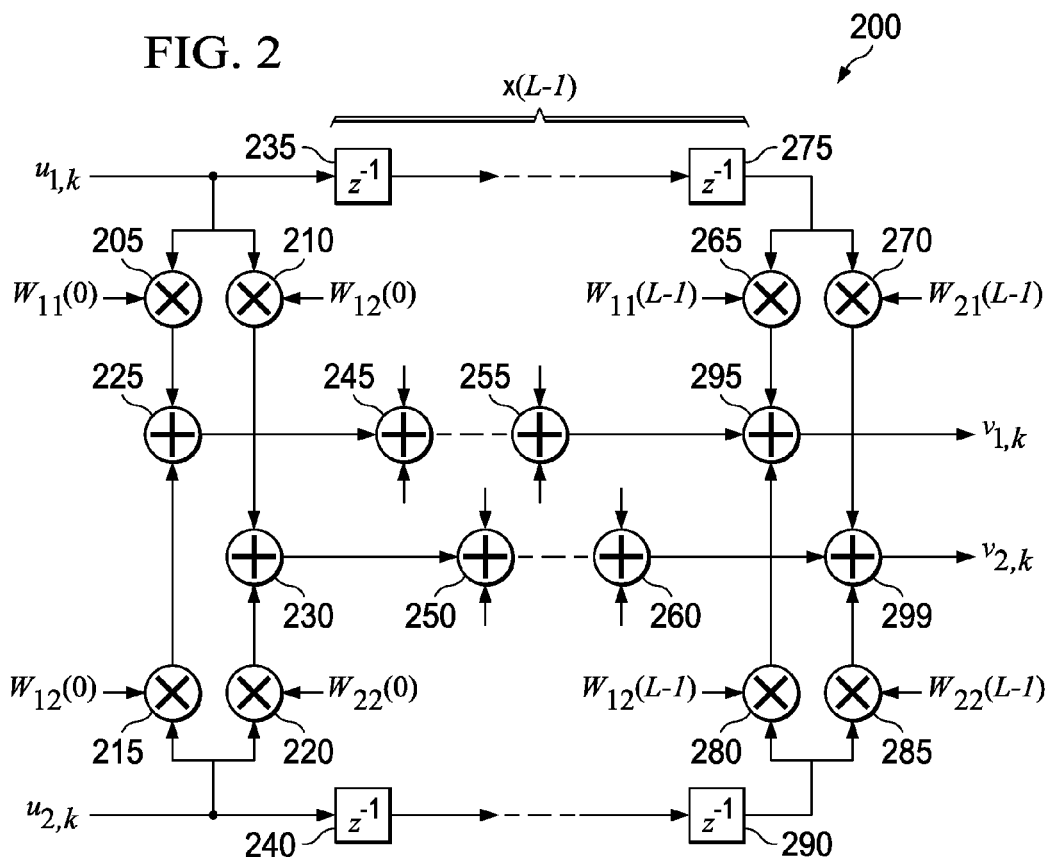
FIG. 2 illustrates a multi-stage digital filter configured to, e.g. demultiplex and equalize two polarization signals potentially subject to Polarization Mode Dispersion (PMD) effects.

FIG. 2 illustrates a method, e.g. an equalizing filter 200, configured to implement the PMD case. The filter 200 includes L stages, wherein each stage receives a corresponding filter matrix W, e.g. W(0),W(1) ... W(L−1). Inputs to the filter 200 include $u_1(k)$ and $u_2(k)$, which are the received polarization signals at sample k. Outputs $v_1(k)$ and $v_2(k)$ are provided as outputs from the filter 200.

Multipliers 205, 210 respectively multiply $u_1(k)$ by $W_{11}(0)$ and $W_{21}(0)$, where l=0 for the first filter stage. Multipliers 215, 220 respectively multiply $u_2(k)$ by $W_{12}(0)$ and $W_{22}(0)$. An adder 225 sums the outputs of the multipliers 205 and 215, and an adder 230 sums the outputs of the multipliers 210 and 220. Delays 235 and 240 respectively delay $u_1(k)$ and $u_2(k)$ by one period of the filter clock for use by the second filter stage at the next filter clock period.

The second stage (not shown) receives the delayed $u_1(k)$ and $u_2(k)$, and also respectively receives the outputs of the adders 225, 230 at adders 245 and 250. The second filter stage applies filter coefficients $W_{11}(1)$, $W_{21}(1)$, $W_{12}(1)$ and $W_{22}(1)$ and again delays $u_1(k)$ and $u_2(k)$. The delayed $u_1(k)$ and $u_2(k)$ and each intermediate stage output step with each period of the filter clock through the remaining L−2 filter stages to the $L^{th}$ stage. Adders 255, 260 provide the output of the penultimate filter stage to the $L^{th}$ stage. Multipliers 265 and 270 receive the delayed $u_1(k)$ from a delay 275. Multipliers 280 and 285 receive the delayed $u_1(k)$ from a delay 290. An adder 295 sums the outputs of the adder 255 and the multipliers 265 and 280 to produce the filter output $v_1(k)$. An adder 299 sums the outputs of the adder 260 and the multipliers 270 and 285 to produce the filter output $v_2(k)$.

Figure 3:
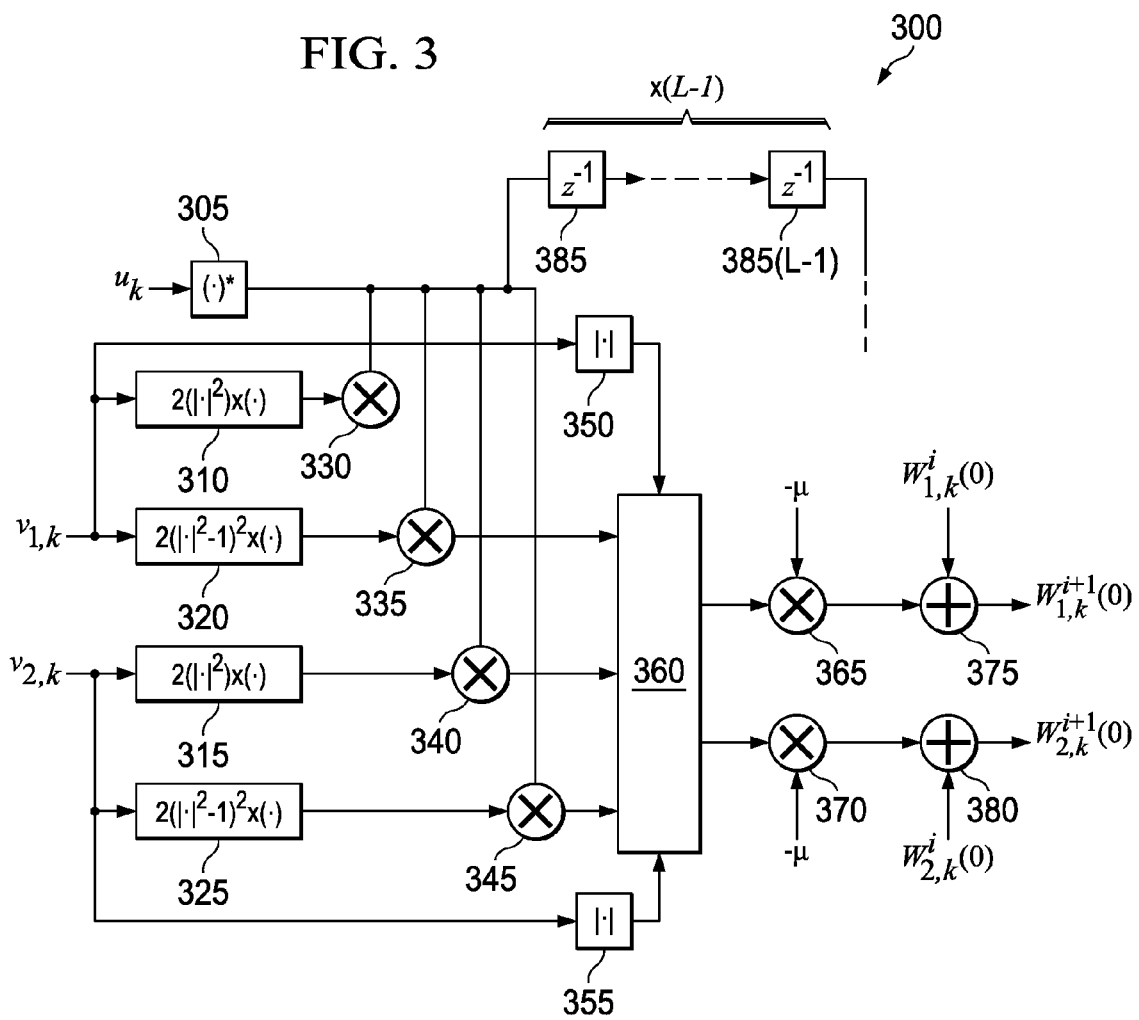
FIG. 3 illustrates a multi-stage tap coefficient update module according to one embodiment and applicable to, e.g. update tap coefficients of an equalizing filter provided in FIG. 4.

FIG. 3 illustrates a filter updater 300 according to one embodiment, e.g. a multistage equalizer tap update module. The updater 300 may be used to update tap coefficients to the tap coefficient inputs of the filter 200. Only the $0^{th}$ stage is explicitly shown in FIG. 3. Those skilled in the pertinent art are capable of adding the intervening stages 1 through L−1.

In the embodiment of FIG. 3, a computational block 305 computes the complex conjugate of $u_1(k)$ and $u_2(k)$. Computational blocks 310 and 315 respectively compute $2 \cdot |v_1(i)|^2 \times v_1(i)$ and $2 \cdot |v_2(i)|^2 \times v_2(i)$. Computational blocks 320 and 325 respectively compute $2 \cdot (|v_1(i)|^2 \times v_1(i)$ and $2 \cdot (|v_2(i)|^2 - 1)^2 \times v_2(i)$. Multipliers 330, 335, 340 and 345 respectively compute the product of the block 305 with each of the blocks 310, 315, 320 and 325. Blocks 350 and 355 respectively compute the absolute values of $v_1(k)$ and $v_2(k)$. A selector 360 reorders the outputs from the multipliers 330, 335, 340 and 345 depending on the relative magnitudes of $v_1(k)$ and $v_2(k)$. Thus the selector 360 outputs to a multiplier 365 the left column of the matrix in Eq. 7 when $|v_1(k)| > |v_2(k)|$, and the left column of the matrix in Eq. 8 when $|v_2(k)| > |v_1(k)|$. Similarly, the selector 360 outputs to a multiplier 370 the right column of the matrix in Eq. 7 when $|v_1(k)| > |v_2(k)|$, and the right column of the matrix in Eq. 8 when $|v_2(k)| > |v_1(k)|$.

The multipliers 365 and 370 multiply their respective received vectors by a scalar $-\mu$ that represents a control gain. A larger value of $\mu$ results in a faster response time by the filter 200, but may result in greater noise introduced in the filtered signal. An adder 375 sums the output of the multiplier 365 and the left column of the coefficient matrix $W^k(0)$, and an adder 380 sums the output of the multiplier 370 and the right column of the coefficient matrix $W^k(0)$. The adder 375 outputs coefficient matrix elements $W_{1,m}^{k+1}(0)$ (the left column) of an updated coefficient matrix $W^{k+1}(0)$, and the adder 380 outputs coefficient matrix elements $W_{2,n}^{k+1}(0)$ (the right column) of the updated coefficient matrix.

Regarding the remaining L−1 tap update stages, a delay chain 385-1 ... 385(L−1) provides $u_n(k)$ ... $u_n(k+L-1)$ to additional tap update stages. In this manner the 1 filter matrixes are updated for use in the $i+1^{st}$ filter clock period.

Frequency Estimation Module

Figure 4:
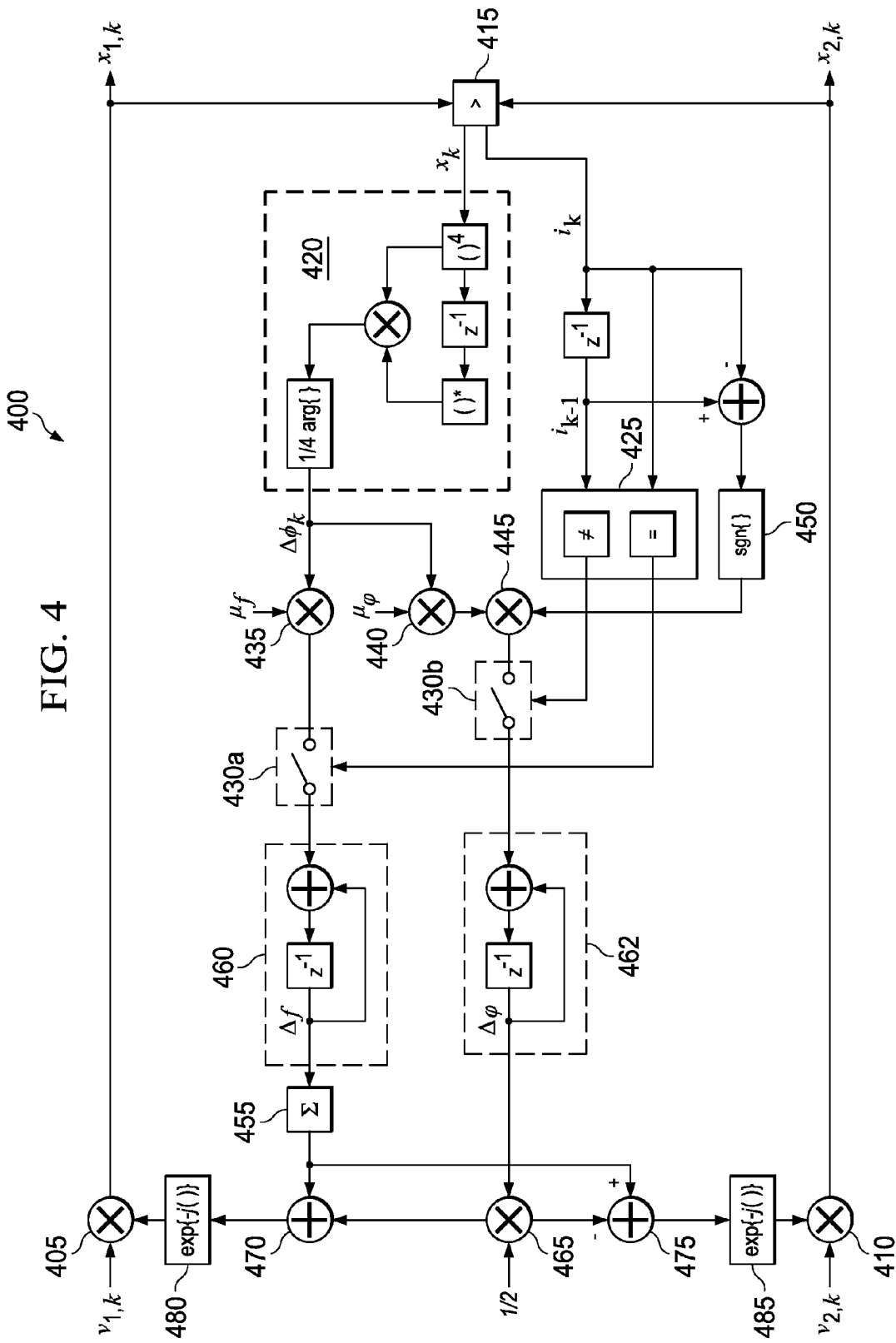
FIG. 4 illustrates a computational block diagram of a method of compensating the frequency of a received signal, e.g. a PS-QPSK modulated signal, including an illustrative embodiment of an equalizing filter.

FIG. 4 illustrates a computational block diagram of a method, e.g. a frequency compensator 400, of frequency compensation of the received PS-QPSK signal. The illustrated embodiment presents a feedback architecture without limitation thereto. Those skilled in the pertinent art will appreciate that the method could be implemented using a feed-forward design with suitable modification. The frequency compensator 400 may be implemented in the frequency estimation module 160 of the optical receiver 100. The frequency compensator 400 receives the $[v_1(k), v_2(k)]$ symbol stream from, e.g. the polarization tracking and equalization module 150. The frequency compensator 400 compensates for phase offsets between the two polarizations. A phase estimation module 500, described below, relies on this compensation to provide a common phase estimation for both polarizations, as described further below.

The intermediate frequency compensation is adapted to perform this task. It uses the differential phase between two consecutive QPSK symbols as error signals for two integral controllers (one per polarization) to drive both the intermediate frequency and phase offset between the two polarizations to zero. In the case that the switch symbol is identical for two consecutive symbols, the differential phase is used to update the intermediate frequency estimate. In the case that the switch bit is different, the differential phase is used to update the phase offset.

In the following discussion the signal received by the frequency compensator 400 from the equalizing filter 200 is represented as a vector $v_k$ as indicated by Eq. 9. The signal output by the frequency compensator 400 is represented as a vector $x_k$ as indicated by Eq. 10.

$$v_k = \begin{bmatrix} v_{1,k} \\ v_{2,k} \end{bmatrix} \tag{9}$$

$$x_k = \begin{bmatrix} x_{1,k} \\ x_{2,k} \end{bmatrix} \tag{10}$$

The frequency compensator 400 operation is also data-dependent, via feedback from the $x_k$ outputs to multipliers 405 and 410. The multiplier 405 multiples $v_{1,k}$ by a first factor described below and outputs $x_{1,k}$. The multiplier 410 multiples $v_{2,k}$ by a second factor also described below and outputs $x_{2,k}$. A comparator 415 determines which of the output values $x_{1,k}, x_{2,k}$ is has a greater energy and outputs the larger of the two values. Eq. 11 describes this selection. The comparator 415 also outputs a tag i identifying the larger datum. This tag may have a value of 1 or 2 as described by Eq. 12.

$$x_k = \begin{cases} x_{1,k} & \text{if } |x_{1,k}| > |x_{2,k}| \\ x_{2,k} & \text{if } |x_{2,k}| > |x_{1,k}| \end{cases} \tag{11}$$

$$i_k = \begin{cases} 1 & \text{if } |x_{1,k}| > |x_{2,k}| \\ 2 & \text{if } |x_{2,k}| > |x_{1,k}| \end{cases} \tag{12}$$

A computational block 420 computes an instantaneous differential phase $\Delta\varphi_k$ described by Eq. 13, in which $x_k$ and $x_{k-1}$ are each raised to the fourth power.

$$\Delta\varphi_k = \frac{1}{4}\arg\{(x_k^4)(x_{k-1}^4)^*\} \tag{13}$$

The intermediate frequency estimation is updated as follows. A comparator 425 determines if the tag i (1 or 2) of a datum at time index k−1 is equal to the tag of the next datum at time index k. If the tags are equal, then the comparator 425 selects a switch 430a. If the tags are not equal then the comparator 425 selects a switch 430b.

A multiplier 435 computes the product of $\mu_f$ and $\Delta\phi_k$, where $\mu_f$ is a first adjustable control gain. A multiplier 440 computes the product of $\mu_\phi$ and $\Delta\phi_k$, where $\mu_\phi$ is a second adjustable control gain. A multiplier 445 multiplies $\mu_\phi\Delta\phi_k$ by a sign computed by a signum function 450 that outputs +1 if $i_k$=1 and $i_{k-1}$=2, and outputs −1 if $i_k$=2 and $i_{k-1}$=1. Thus, the multiplier 445 outputs $\pm\mu_\phi\Delta\phi_k$.

The operation of the switch 430a, multiplier 435 and a delay loop 460 implements Eq. 14:

$$\Delta f_{k+1} = \begin{cases} \Delta f + \mu_f \Delta\phi_k & \text{if } i_k = i_{k-1} \\ \Delta f & \text{if } i_k \neq i_{k-1} \end{cases} \quad (14)$$

The operation of the switch 430b, the multiplier 445 and a delay loop 462 implements Eq. 15:

$$\Delta\varphi_{k+1} = \begin{cases} \Delta\varphi_k + \mu_f \Delta\varphi_k & \text{if } i_k = 1 \cap i_{k-1} = 2 \\ \Delta\varphi_k - \mu_f \Delta\varphi_k & \text{if } i_k = 2 \cap i_{k-1} = 1 \\ \Delta\varphi_k & \text{if } i_k = i_{k-1} \end{cases} \quad (15)$$

Sigma block 455 computes a running total $\Sigma(\Delta f_k)$. A multiplier 465 scales $\Delta\phi_k$ by ½. Adders 470 and 475 respectively compute the sum and difference of $\Sigma(\Delta f_n)$ and ½$\Delta\phi_k$. An exponentiation block 480 computes the exponential of the adder 470 output scaled by −j, while an exponentiation block 485 computes the exponential of the adder 475 output scaled by −j. The multiplier 405 computes the product of $v_{1,k}$ and the result from the block 480 to produce $x_{1,k}$. The multiplier 410 computes the product of $v_{2,k}$ and the result from the block 485 to produce $x_{2,k}$. The described operation of the elements 405, 410, 465, 470, 475, 480 and 485 implement Eq. 16.

$$x_{1,k} = v_{1,k} \exp\left\{-j\left(\pm\frac{\Delta\phi_n}{2} + \sum_{n=0}^{k} \Delta f_n\right)\right\} \quad (16)$$

Phase Estimation Module

Figure 5:
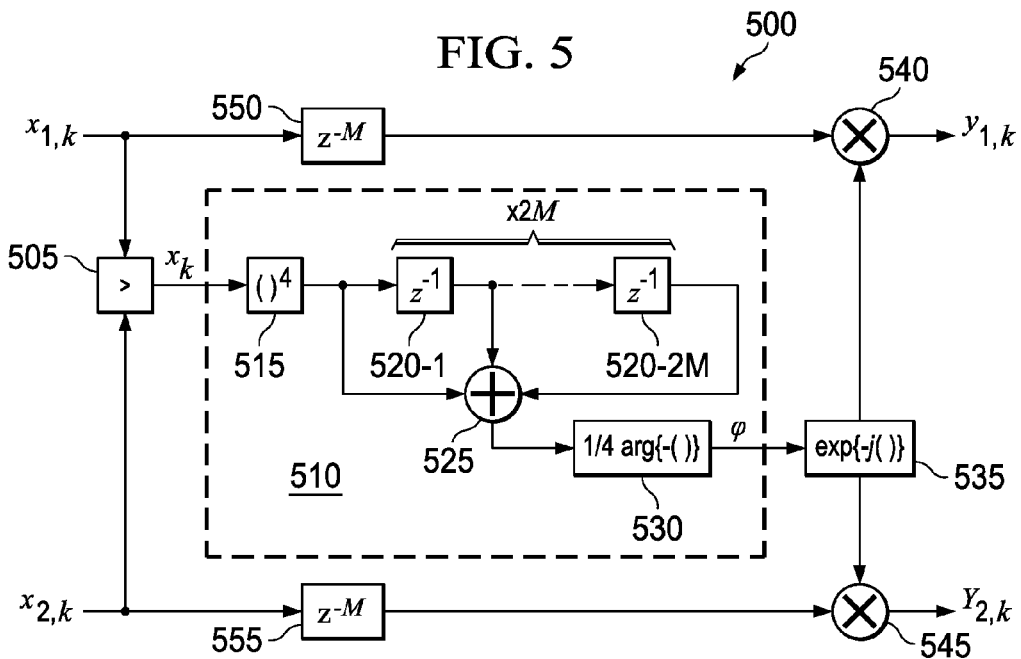
FIG. 5 illustrates a computational block diagram of a method of feed-forward carrier recovery from a received signal, e.g. a PS-QPSK modulated signal.

Referring back to FIG. 1, embodiments of the phase estimation module 170 are now described. FIG. 5 illustrates a computational block diagram of a method, e.g. a phase compensator 500, of performing phase compensation on the received PS-QPSK signal. The phase compensator 500 takes into account the switch symbol in PS-QPSK symbol pair. Because the switch symbol essentially has no phase (e.g. a null signal), the switch symbol cannot typically be used to estimate frequency and phase offsets. In the case of phase recovery, the received QPSK point from each symbol time is extracted into a single data stream, and recovery is performed using this data stream. This typically requires that phase offsets between the two polarizations (introduced, e.g. by the equalization module 150) are compensated beforehand as previously described.

The phase compensator 500 receives the output $$x_k = \begin{bmatrix} x_{1,k} \\ x_{2,k} \end{bmatrix}$$

from the frequency estimation module 160, e.g. executing the frequency compensator 400, outputs a phase-compensated data stream $$y_k = \begin{bmatrix} y_{1,k} \\ y_{2,k} \end{bmatrix}.$$

A comparator 505 selects the QPSK symbol, $x_{1,k}$ or $x_{2,k}$, that has the higher energy (Eq. 17).

$$x_k = \begin{cases} x_{1,k} & \text{if } |x_{1,k}| > |x_{2,k}| \\ x_{2,k} & \text{if } |x_{2,k}| \geq |x_{1,k}| \end{cases} \quad (17)$$

A block 510 computes an estimated phase $\phi_k$ with a filter half-width of M. The computational algorithm is illustrated by, e.g. Eq. 18. A module 515 computes $x_k^4$ and provides this value to a first delay module 520-1. The module 515 then computes $x_{k+1}^4$ and provides this value to the first delay module 520-1 as the first delay module 520-1 passes $x_k^4$ to a second delay module (not shown). This operation is repeated for an additional 2M-2 symbols. When $x_k^4$ reaches the delay module 520-2M, an adder 525 computes a summation of the values output by each delay module 520. A module 530 computes the arg{ } function of the negated summation and scales the result by ¼.

$$\varphi_k = \frac{1}{4}\arg\left\{\sum_{m=-M}^{M} x_{k-m}^4\right\} \quad (18)$$

A module 535 then computes the exponential of the estimated phase $\phi_k$ scaled by −j. Multipliers 540 and 545 respectively compute the product of $x_{1,k}$ and $x_{2,k}$ and the output of the module 535. Delay modules 550, 555 respectively align $x_{1,k}$ and $x_{2,k}$ with the computation by the block 510. The output of the method phase compensator 500 is shown by Eq. 19.

$$y_k = \begin{bmatrix} x_{1,k} \\ x_{2,k} \end{bmatrix} \exp\{-j\varphi_k\} \quad (19)$$

The described method of carrier phase recovery may be extended to cases of nonlinear noise. FIG. 6 illustrates a method, e.g. a phase compensator 600, in an illustrative embodiment. In FIG. 6 the input and output data streams are again designated $$x_k = x\begin{bmatrix} v_{1,k} \\ x_{2,k} \end{bmatrix} \text{ and } y_k = \begin{bmatrix} y_{1,k} \\ y_{2,k} \end{bmatrix}.$$

The QPSK symbol with the greater energy is selected, as described by Eqs. 20 and 21, with the lower-energy symbol being set to zero. The resulting data vector is designated $$\tilde{x}_k = \begin{bmatrix} \tilde{x}_{1,k} \\ \tilde{x}_{2,k} \end{bmatrix}.$$

$$\tilde{x}_{1,k} = \begin{cases} x_{1,k} & \text{if } |x_{1,k}| > |x_{2,k}| \\ 0 & \text{if } |x_{1,k}| \le |x_{2,k}| \end{cases} \quad (20)$$

$$\tilde{x}_{2,k} = \begin{cases} x_{2,k} & \text{if } |x_{2,k}| > |x_{1,k}| \\ 0 & \text{if } |x_{2,k}| \le |x_{1,k}| \end{cases} \quad (21)$$

Thus, a comparator module 604 provides $\tilde{x}_{1,k}$ when $|x_{1,k}| > |x_{2,k}|$, and a comparator module 608 provides $\tilde{x}_{2,k}$ when $|x_{2,k}| > |x_{1,k}|$.

Equations 22 and 23 describe a phase estimate determined as a function of $\tilde{x}_{1,k}$ and $\tilde{x}_{2,k}$. The equations apply a filter half width of M, and include a correlation factor c that determines a contribution from $x_{2,k}$ to $\phi_{1,k}$ and a contribution of $x_{1,k}$ to $\phi_{2,k}$.

$$\varphi_{1,k} = \frac{1}{4} \arg \left\{ \sum_{m=-M}^{M} (\tilde{x}_{1,k-m}^4 + c\tilde{x}_{2,k-m}^4) \right\} \quad (22)$$

$$\varphi_{2,k} = \frac{1}{4} \arg \left\{ \sum_{m=-M}^{M} (\tilde{x}_{2,k-m}^4 + c\tilde{v}_{1,k-m}^4) \right\} \quad (23)$$

The phase-compensated symbol stream $$y_k = \begin{bmatrix} y_{1,k} \\ y_{2,k} \end{bmatrix}$$

is then computed as shown in Eq. 24.

$$y_k = \begin{bmatrix} y_{1,k} \\ y_{2,k} \end{bmatrix} = \begin{bmatrix} x_{1,k} \exp\{-j\varphi_{1,k}\} \\ x_{2,k} \exp\{-j\varphi_{2,k}\} \end{bmatrix} \quad (24)$$

Referring to FIG. 6, modules 612 and 616 respectively compute the fourth power of $\tilde{x}_{1,k}$ and $\tilde{x}_{2,k}$. Delay modules 620-1 . . . 620-2M sequentially delay $\tilde{x}_{1,k}$, with outputs of each delay module being summed by an adder 624. Delay modules 628-1 . . . 628-2M and an adder 632 operate analogously with respect to $\tilde{x}_{2,k}$. A multiplier 636 scales the output of the adder 624 by the correlation factor c, with the scaled output being combined with the output of the adder 632 by an adder 640. Similarly, a multiplier 644 scales the output of the adder 632 by the correlation factor c, with the scaled output being combined with the output of the adder 624 by an adder 648.

A module 652 computes the arg{ } function of the output of the adder 648 and scales this value by ¼. A module 656 scales the output of the module 652 by –j and computes the exponential of the scaled value. A multiplier 660 computes the product of the exponential value from the module 656 and $\tilde{x}_{1,k}$ delayed by M clock cycles by a delay module 664 to produce $y_{1,k}$.

Similarly, a module 668 computes the arg{ } function of the output of the adder 640 and scales this value by ¼. A module 672 scales the output of the module 668 by –j and computes the exponential of the scaled value. A multiplier 676 computes the product of the exponential value from the module 672 and $\tilde{x}_{2,k}$ delayed by M clock cycles by a delay module 680 to produce $y_{2,k}$.

Decision Module

The decision module 180 receives the vector $$y_k = \begin{bmatrix} y_{1,k} \\ y_{2,k} \end{bmatrix}$$

from the phase estimation module 170, where k is the time index. The vector components can each be viewed in terms of in-phase and quadrature components, e.g.

$$y_2 = y_{1i} + jy_{1q} \quad (25)$$

$$y_2 = y_{2i} + jy_{2q} \quad (26)$$

where the subscripts i and q respectively denote in-phase and quadrature components, and the time index k is assumed. The vector y can be viewed as a four-dimensional vector in a 4-D space.

The ML detection scheme determines the symbol $\hat{y}$ represented by the vector y. There are eight possible symbols in PS-QPSK represented by a constellation Y, where Y={(0,1+j), (0,1–j), (0,–1+j), (0,–1–j) (1+j,0), (1–j,0) (–1+j,0), (–1–j, 0)}, where the customary normalization factor $\sqrt{2}/2$ is omitted.

The ML decision is formulated as $$\hat{y} = \arg\left(\max_{z \in Y} p(y|z)\right) \quad (27)$$

where p(y|z) is the conditional probability density function of y given z. It can be shown that in presence of independent additive white Gaussian noise (AWGN) in each of the four dimensions of the 4-D vector space, the ML detection problem reduces to $$\hat{y} = \arg\left(\min_{z \in Y} \|y - z\|^2\right) \quad (28)$$

or restated, $$\hat{y} = \arg\left[\min_{z \in Y}((y_{1i} - z_{1i})^2 + (y_{1q} - z_{1q})^2 + (y_{2i} - z_{2i})^2 + (y_{2q} - z_{2q})^2)\right] \quad (29)$$

In another embodiment, the symbol detection is performed using a data-dependent technique, in which the symbol decision depends on the relative energy of the received symbols $y_1$ and $y_2$. An value associated with the energy may be calculated for each symbol as follows:

$$e_1 = y_{i1}^2 + y_{q1}^2 \quad (30)$$

$$e_2 = y_{i2}^2 + y_{q2}^2 \quad (31)$$

If $e_1 > e_2$, then the method assumes that $y_2 = 0$ (switch symbol), and determines $y_1$ as for a normal QPSK symbol decision. If $e_2 > e_1$ then the method analogously determines the value of $y_2$.

In some cases the ML detection method is preferred over the data-dependent method, as the ML method provides a more optimized detection. For example, at lower Signal to Noise Ratios (SNRs), the ML method provides more accurate data detection. This is because it is the optimal decision method, e.g. in an additive white Gaussian noise channel. At high SNRs, the performance difference between the ML and data-dependent methods is expected to be very close. With certain low-probability noise realizations, the data-dependent method can be incorrect while the ML-detection chooses the right symbols. This requires a somewhat larger magnitude of noise, which is more likely to occur at lower SNRs.

Turning to FIG. 7, illustrated is a simulated bit error rate (BER) characteristic as a function of electrical signal-to-noise ratio (SNR) for two cases. The characteristic traced with a dashed line corresponds to a representative conventional PDM-QPSK implementation. The characteristic traced by the solid line corresponds to PDM-QPSK implemented as by various embodiments of PS-QPSK described herein. It can be seen that the BER of the PS-QPSK method is lower for all values of SNR within the simulation space, indicating greater noise tolerance of embodiments of the invention relative to PDM-QPSK modulation. It is noted that the overall data rate is lower for PS-QPSK. This illustrated simulation assumes that both signals have the same bandwidth, but in this case, PS-QPSK has 75% of the data rate of PDM-QPSK. However, as described previously, the sacrifice in data rate is balanced by having greater noise immunity (e.g., higher sensitivity), which will allow transmission of longer distances.

FIG. 8 presents method 800, e.g. for forming an optical receiver system such as the system 100. The steps of the method 800 are described without limitation by reference to elements previously described herein, e.g. in FIGS. 1-6. The steps of the method 800 may be performed in another order than the illustrated order, and in some embodiments may be omitted altogether.

In a step 810 an optical front end, e.g. the receiver 100, is configured to receive an optical signal bearing first and second bits on respective first and second polarization channels. In a step 820 an equalizer, e.g. the polarization tracking and equalization module 150, is configured to 1) select a first cost function if said first bit has greater energy than said second bit, 2) elect a second different cost function if said second bit has a greater energy than said first bit, and 3) update coefficients of an adaptive filter configured to demultiplex and equalize said first and second polarization channels.

In a step 830 a frequency compensator, e.g. the frequency estimation module 160, is configured to update a frequency estimate of said first and second polarization channels if said first bit has greater energy than said second bit for two adjacent bit periods.

In a step 840 a phase compensator, e.g. the phase estimation module 170, is configured to compute an estimated phase of said optical signal based on said first bit if said first bit has a greater energy than said second bit, and to compute said estimated phase based on said second bit if said second bit has a greater energy than said first bit.

In a step 850 the phase compensator is configured to estimate a phase of said first bit based on a first sequence of bits received on said first polarization channel and a second sequence of bits received on said second polarization channel.

In a step 860 a programmable gate array is configured to implement said equalizer module.

Those skilled in the art to which this application relates will appreciate that other and further additions, deletions, substitutions and modifications may be made to the described embodiments.

What is claimed is:

1. An apparatus comprising:
   an optical front end for receiving an optical signal bearing first and second symbols on respective first and second polarization channels;
   an equalizer configured to:
   select a first cost function if said first symbol has greater energy than said second symbol;
   select a second different cost function if said second symbol has a greater energy than said first symbol; and
   based on the selected cost function, update coefficients of an adaptive filter configured to demultiplex and equalize said first and second polarization channels; and
   a frequency compensator configured to compensate for a phase offset between said first and second polarization channels using first and second consecutive symbols in each of said first and second polarization channels to reduce an intermediate frequency of said phase offset between said first and second polarization channels.

2. The apparatus of claim 1, wherein said frequency compensator is further configured to update a frequency estimate of said first and second polarization channels if said first symbol has greater energy than said second symbol for two adjacent symbol periods.

3. The apparatus of claim 1, further comprising a phase compensator configured to compute an estimated phase of said optical signal based on said first symbol if said first symbol has a greater energy than said second symbol, and to compute said estimated phase based on said second symbol if said second symbol has a greater energy than said first symbol.

4. The apparatus of claim 3, wherein said phase compensator is configured to estimate a phase of said first symbol based on a first sequence of symbols received on said first polarization channel and a second sequence of symbols received on said second polarization channel.

5. The apparatus of claim 1, wherein said equalizer is implemented on a field programmable gate array.

6. The apparatus of claim 1, wherein said optical front end is configured to receive light in the optical L band.

7. The apparatus of claim 2, further comprising a phase compensator configured to compute an estimated phase of said optical signal based on said first symbol if said first symbol has a greater energy than said second symbol, and to compute said estimated phase based on said second symbol if said second symbol has a greater energy than said first symbol.

8. An apparatus comprising:
   an optical front end configured to receive an optical signal bearing first and second symbols on respective first and second polarization channels;
   a frequency compensator configured to compensate for a phase offset between said first and second polarization channels using a differential phase between first and second consecutive symbols in each of said first and second polarization channels to reduce an intermediate frequency and said phase offset between said first and second polarization channels; and
   a phase compensator configured to compute an estimated phase of said optical signal based on said first symbol if said first symbol has a greater energy than said second symbol, and to compute said estimated phase based on said second symbol if said second symbol has a greater energy than said first symbol.

9. The apparatus of claim 8, wherein said frequency compensator is further configured to update a frequency estimate of said first and second polarization channels if said first symbol has greater energy than said second symbol for two adjacent symbol periods.

10. The apparatus of claim 9, further comprising a phase compensator configured to compute an estimated phase of said optical signal based on said first symbol if said first symbol has a greater energy than said second symbol, and to compute said estimated phase based on said second symbol if said second symbol has a greater energy than said first symbol.

11. The apparatus of claim 10, wherein said phase compensator is configured to estimate a phase of said first symbol based on a first sequence of symbols received on said first polarization channel and a second sequence of symbols received on said second polarization channel.

12. The apparatus of claim 8, wherein said equalizer is implemented on a field programmable gate array.

13. The apparatus of claim 8, wherein said optical front end is configured to receive light in the optical L band.

14. The apparatus of claim 8, further comprising a phase compensator configured to compute an estimated phase of said optical signal based on said first symbol if said first symbol has a greater energy than said second symbol, and to compute said estimated phase based on said second symbol if said second symbol has a greater energy than said first symbol.

15. A method, comprising:
    configuring an equalizer of an optical front end to:
        select a first cost function if a first symbol received by an optical front end on a first polarization channel has greater energy than a second symbol received by the optical front end on a second polarization channel;
        select a second different cost function if said second symbol has a greater energy than said first symbol; and
        based on the selected cost function, update coefficients of an adaptive filter configured to demultiplex and equalize said first and second polarization channels; and
    configuring a frequency compensator to compensate for a phase offset between said first and second polarization channels using a differential phase between first and second consecutive symbols in each of said first and second polarization channels to reduce an intermediate frequency and said phase offset between said first and second polarization channels.

16. The method of claim 15, wherein said frequency compensator is further configured to update a frequency estimate of said first and second polarization channels if said first symbol has greater energy than said second symbol for two adjacent symbol periods.

17. The method of claim 15, further comprising configuring a phase compensator to compute an estimated phase of said optical signal based on said first symbol if said first symbol has a greater energy than said second symbol, and to compute said estimated phase based on said second symbol if said second symbol has a greater energy than said first symbol.

18. The method of claim 17, wherein said phase compensator is configured to estimate a phase of said first symbol based on a first sequence of symbols received on said first polarization channel and a second sequence of symbols received on said second polarization channel.

19. The method of claim 15, further comprising configuring a programmable gate array to implement said equalizer.

20. The method of claim 15, wherein said optical front end is configured to receive light in the optical L band.

21. A method, comprising:
    selecting a first cost function if a first symbol received by an optical front end on a first polarization channel has greater energy than a second symbol received by said optical front end on a second polarization channel;
    selecting a second different cost function if said second symbol has a greater energy than said first symbol;
    based on the selected cost function, updating coefficients of an adaptive filter configured to demultiplex and equalize said first and second polarization channels; and
    compensating for a phase offset between said first and second polarization channels using a differential phase between first and second consecutive symbols in each of said first and second polarization channels to reduce an intermediate frequency and said phase offset between said first and second polarization channels.

* * * * *